United States Patent [19]
Stewart

[11] Patent Number: 6,049,718
[45] Date of Patent: Apr. 11, 2000

[54] TELEPHONE SYSTEM AND METHOD WITH BACKGROUND LOCATION RESPONSE CAPABILITY

[76] Inventor: Gordon M. Stewart, 10 Kalleston Dr., Pittsford, N.Y. 14534-2920

[21] Appl. No.: 08/902,090

[22] Filed: Jul. 29, 1997

[51] Int. Cl.[7] .................................................. H04Q 7/06
[52] U.S. Cl. ........................... 455/456; 455/457; 455/461
[58] Field of Search .................................. 455/456, 457, 455/461

[56] References Cited

U.S. PATENT DOCUMENTS

| | | | |
|---|---|---|---|
| 5,508,707 | 4/1996 | LeBlanc et al. | 455/31.3 |
| 5,596,500 | 1/1997 | Sprague et al. | 455/31.3 |
| 5,768,686 | 6/1998 | LeBlanc et al. | 455/31.3 |

*Primary Examiner*—David R. Hudspeth
*Assistant Examiner*—Daniel Abebe

[57] ABSTRACT

A portable telephone capable of background location transmission response, and methods which can be executed by such a telephone or a system using such a telephone. In one such portable telephone, a position locator which, in response to a location request signal, can determine the location of the portable telephone and generate a corresponding location signal. A receiver receives an incoming call signal and an incoming location request signal. A user interface has: an audio or visual user output device which can reproduce audio or visual information in an incoming call signal as a corresponding audio or visual display; and an audio user input device which generates an audio output signal corresponding to a user's voice. An alert generator which, in response to a received incoming call signal, generates a first physical characteristic to indicate an incoming call to a user of the portable telephone. A location request detector which, in response to a received location request signal, can direct the location request signal to the position locator without activating the alert generator. A transmitter to transmit a location signal generated by the position locator in response to a received location request signal, and to transmit the audio output signal.

10 Claims, 5 Drawing Sheets

TELEPHONE SYSTEM AND METHOD WITH BACKGROUND LOCATION RESPONSE CAPABILITY

FIELD OF THE INVENTION

The present invention relates to apparatus, systems and methods, which allow a location of a portable telephone to be obtained from a remote location in a background operation mode.

BACKGROUND OF THE INVENTION

Portable telephones, particularly in the form of current cellular telephones, are well known. In addition, several companies have disclosed and are proceeding with plans for a network of low-orbiting satellites which will allow communication from portable telephones from almost anywhere in the world, without relying on the multiple call regions or "cells" in a cellular telephone system. Portable devices which allow a user to determine their location particularly based on various satellite positioning systems, are also now known. Such systems are generally referred to as Global Positioning Systems ("GPS"). These systems use signals from a series of satellites which allow a portable receiver (i.e. a GPS receiver) on earth to determine its position with a fairly high degree of accuracy.

It is often desirable for one individual to know the location of another. It would be desirable if a first person can conveniently find the location of a second person who might be carrying a portable telephone, without the first person having to call the second person on the portable telephone and interrupt the second person. For example, the second person might be in a meeting and would not consider it convenient to even have a first person call them just to ask where they are, although they might still like to receive on their portable telephone calls for other purposes. Of course, the second person would have no way of knowing whether a call to their portable telephone was for some important reason (e.g. a business call) or just a call from a relative or friend to ask where they are and when they might be home.

SUMMARY OF THE INVENTION

The present invention provides a means by which individuals can obtain the location of a portable telephone user by providing the portable telephone with a position locator, such as GPS receiver. The present invention further recognizes that in many situations it is desirable that the portable telephone user not be disturbed to answer a call just to report their location to a spouse, friend, or the like. Therefore, the present invention provides a means by which the portable telephone user can continue to receive other calls to their portable telephone as usual. Further, the present invention provides a means by which calls for location requests only can be directly routed to a position locator on the portable telephone, and the location information automatically supplied to the caller from the position locator on the portable telephone, all without disturbing the portable telephone user.

In accordance with one aspect of the invention then, there is provided a portable telephone capable of background location transmission response, comprising:

a) a position locator which, in response to a location request signal, can determine the location of the portable telephone and generate a corresponding location signal;

b) a receiver to receive an incoming call signal and an incoming location request signal;

c) a user interface having:
an audio or visual user output device which can reproduce audio or visual information in an incoming call signal as a corresponding audio or visual display; and
an audio user input device which generates an audio output signal corresponding to a user's voice;

d) an alert generator which, in response to a received incoming call signal, generates a first physical characteristic to indicate an incoming call to a user of the portable telephone, e) a location request detector which, in response to a received location request signal, can direct the location request signal to the position locator without activating the alert generator;

f) a transmitter to transmit a location signal generated by the position locator in response to a received location request signal, and to transmit the audio output signal.

In another aspect of the present invention, there is provided a telephone system capable of providing data communication between any of a plurality of first telephones and a remote portable telephone, and capable of location response, comprising:

a) a portable telephone having:
(i) a position locator which can determine the location of the portable telephone and generate a corresponding location signal;
(ii) a receiver to receive an incoming location request signal;
(iii) a user interface having:
an audio or visual output device which can reproduce audio or visual information in an incoming call signal as a corresponding audio or visual display; and
an audio user input device which generates an audio output signal corresponding to a user's voice;
(iv) a location request detector which, in response to a received location request signal, can direct the location request signal to the position locator; and
(v) a transmitter to transmit a location signal generated by the position locator in response to a received location request signal;

b) a centralized base station having:
(i) means for receiving from any calling one of the plurality of first telephones, an incoming location request signal;
(ii) a transceiver to transmit an incoming location request signal to the portable telephone, and to receive a location signal from the portable telephone;
(iii) a location identification means for determining the location of the calling one of the first telephones from a caller identification carried by the incoming signal;
(iv) a comparator for determining the distance between the location received from the portable telephone and the location of the calling one of the first telephones, and generating a resulting distance signal or estimated travel time signal; and
(v) means for forwarding the distance signal or estimated travel time signal to the calling one of the first telephones or the portable telephone.

In a still further aspect of the present invention, there is provided a method of communicating with a portable telephone and obtaining a background location transmission response from the portable telephone, comprising:

a) communicating a call signal from a first telephone to a centralized base station through a first network through which any of a plurality of first telephones can communicate with the centralized base station;

b) transmitting an incoming call signal received from a first telephone at the base station, from the centralized base station to the portable telephone;

c) activating an alert generator on the portable telephone in response to the received incoming call signal, so as to generate a first physical characteristic to indicate an incoming call to a user of the portable telephone;

c) transmitting an audio output signal corresponding to a user's voice, form the portable telephone to the centralized base station;

d) communicating a location request signal from a first telephone through the first network to the centralized base station;

e) transmitting an incoming location request signal received from a first telephone at the base station, from the centralized base station to the portable telephone;

f) receiving the location request signal at the portable telephone;

g) directing the location request signal to a position locator on the portable telephone without activating the alert generator, which position locator can determine the location of the portable telephone and generate a corresponding location signal;

c) transmitting the location signal from the portable telephone to the centralized base station;

d) communicating location information corresponding to the location signal, from the centralized base station to the first telephone which communicated the location request to the base station.

The present invention then, provides a convenient means by which an individual can obtain the location of a user of a portable telephone automatically and without disturbing that user by requiring them to answer a call just for their location. The alert generator on the portable telephone which signals a user of a normal incoming telephone call, is bypassed automatically upon detection of a location request signal and the position locator communicates the position information also automatically to the caller. Further, the present invention additionally provides means by which a street location and/or the distance between the caller and the portable telephone user can also be automatically reported to the caller, rather than just other location information (such as geographic location only) which might be generated by the position locator on the portable telephone.

DRAWINGS

Embodiments of the invention will now be described with reference to the drawings, in which.

EMBODIMENTS OF THE INVENTION

Figure 1:
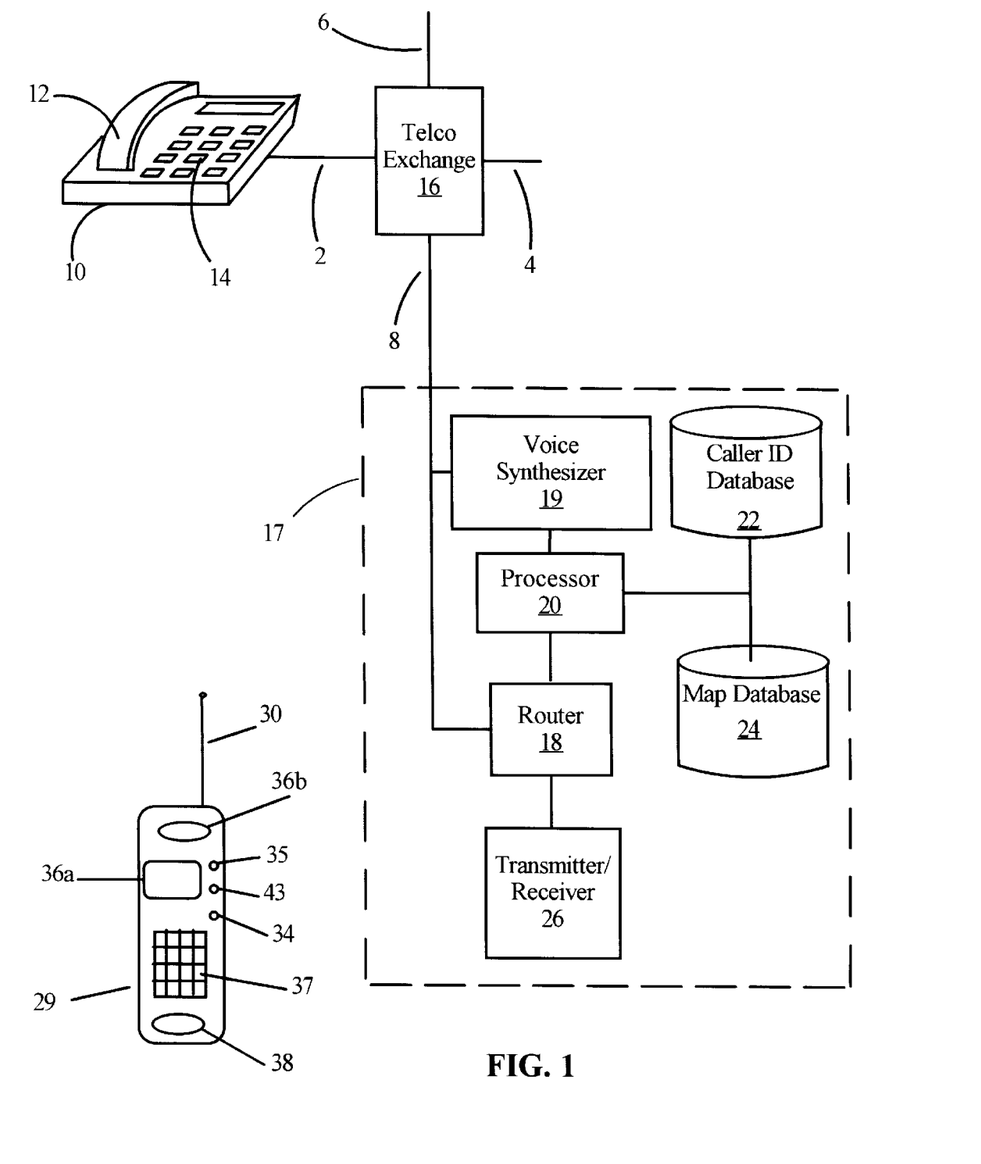
FIG. 1 schematically illustrates a centralized base station and a portable telephone which can execute a method of the present invention.

Referring first to FIG. 1, the apparatus shown includes a first telephone 10, having a typical handset 12 with both an earphone for audio output and a microphone for a user audio input (in particular, a voice input). A keypad 14 provides a means for dialing in the usual fashion. First telephone can communicate over a line 2 to a telephone exchange 16. Other lines 4 and 6 allow other telephones the same or similar to first telephone 10, to communicate with the exchange 16. Line 18 allows communication between the telephone exchange 16 and a centralized base station 17. Lines 2, 4, 6, 8 and exchange 16 form a first network through which multiple first telephones can communicate with the centralized base station 17. While the particular first telephone 10 is shown connected by a line 2, it will be understood that one or more of lines 2, 4, 6, or 8 could instead be cableless connections such as radio or satellite connections. For example, first telephone 10 itself could be a portable telephone. At the exchange 16, any particular first telephone communicating with the exchange 16 is identified by its connection and a caller identification code ("caller ID code"), in the form of a first network address (e.g. the telephone number of that phone) is added to a calling signal routed through exchange 16. Alternatively, the caller ID code could be entered into keypad 14 of first telephone or spoken into handset 12 (and interpreted by suitable voice recognition software on processor 20).

With the standard keypad 10, a first telephone can communicate through the first network with other phones, both portable and stationary. For the sake of simplicity only one exchange 16 is shown between first phone 10 and centralized base station 17, but others could be present. In the present invention, when a user at first phone 10 wishes to reach a portable telephone, they enter in keypad 14 the network address (that is, the phone number) of that portable telephone in the usual manner. Exchange 16 is programmed to recognize the class of phone numbers to which a dialed portable phone belongs, as one which is to be routed to centralized base station 17. This can be accomplished by having all such portable phone numbers start with a given numerical sequence, such as "222". In addition, once a first telephone is connected to centralized base station 17, but before centralized base station 17 contacts the portable phone whose number was dialed by a first telephone, the keypad 14 can be used to enter a predetermined location request signal in the form of a further code, such as "**" or any other preselected alphanumeric combination on keypad 14.

Centralized base station 17 includes a router 18 which receives incoming calls and incoming location request signals from any phone on the first network. Router 18 is capable of waiting a preselected time following receipt of an incoming call from a first telephone, to ascertain whether there is also a received location request signal. If no location request signal is received, router 18 will connect the caller through transmitter/receiver the portable telephone 28 whose number was dialed at a first telephone. If a location request signal is received within the preselected time, router 18 will first direct the received caller identification to a suitably programmed processor 20, which has access to a caller ID database 22 and a map database 24. Caller ID database 22 contains data correlating phone numbers of fixed telephones (that is, telephones which are not portable and tend to remain in a fixed location) in a given geographic region (for example, within a fixed radius of base station 17) with geographic locations. Map database contains a street map correlated with geographic co-ordinates. Router 18 and processor 20 are further suitably programmed to execute the steps of the methods disclosed below.

A typical portable telephone 28 has a housing 29 within which are provided the necessary electronics, as well as a power supply compartment to hold a battery. Such telephones, including battery are typically less than 10 pounds in weight, and often less than 5 or even 2 pounds, and currently even less than 1 pounds. The battery itself is usually less than 2 or 1 pounds, or currently less than 0.5 pounds. Further, they are usually less than 6 inches by 3 inches in length and width and less than 1 inch in thickness. Portable telephone 28 also has an audio input device 38 in the form of a microphone, a keypad 37 similar in operation to keypad 14 of first telephone 10, and an audio-visual display device 36 which includes an audio output in the form of earphone 36b and liquid crystal display ("LCD display") 36a. An antenna 30 allows transmission and reception with remote locations such as centralized base station 17, and also receives signals for a GPS location detector 40. A user call alert 34 in the form of small speaker and associated driver circuitry, provides a user with a first physical characteristic in the form of an audible first alert indicating an incoming call signal. A user location alert 35 in the form of a light (such as an LED) and associated circuitry, illuminates to provide a user with a second physical characteristic preferably different from the first physical characteristic, for example in the form of a visible indication of an incoming location request signal, and remains illuminated while a location request is being processed and transmitted. Alternatively, user location alert 35 could be a vibrator which alerts a user by means of a vibration of portable phone 28 when it is near the user's body. By a user entering an appropriate sequence of characters on keypad 37 (such as "###") the keypad 37 can also act as a bypass switch 42 which in one position causes an incoming location request signal to not only illuminate the light of user location alert 35, but also causes call alert 34 to sound. Re-entry of the same character sequence on keypad 37 causes bypass switch 42 to return to its normal setting in which an incoming location request signal activates only the light of user location alert 35, and not the audible alarm provided by the speaker of user call alert 34. An alert switch indicator 43, in the form another LED ("light emitting diode") indicates which position bypass switch 42 is in.

Figure 2:
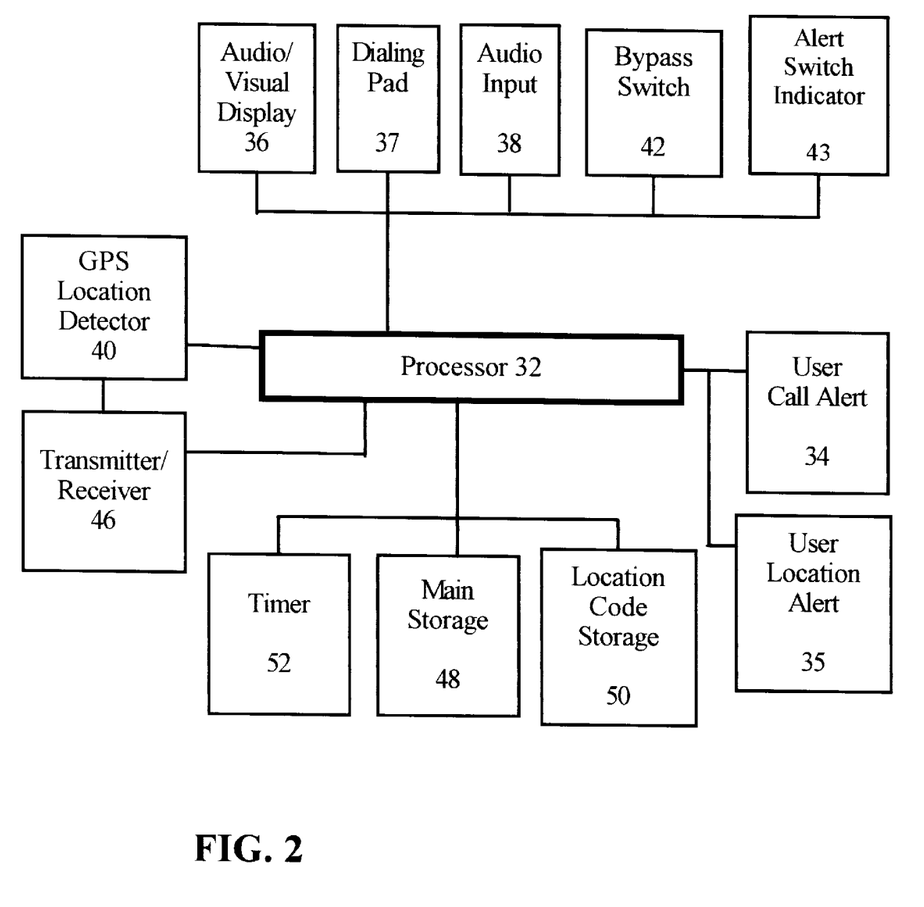
FIG. 2 is a block diagram illustrating the components of a portable telephone of the present invention, such as the portable telephone of FIG. 1.

Referring to FIG. 2, a schematic of the components of portable telephone 28 is provided. Most of the functions of portable telephone 32 are executed by processor 32. Processor 32 is a digital microprocessor suitably programmed to execute the methods performed by portable telephone 32 as described herein. However, it will be appreciated throughout this application that processor 32 or any hardware or software described in any of the components of the present application, can be replaced by equivalent hardware and/or software to perform the necessary functions. Processor 32 uses a main storage 48 in which the necessary programming code is stored and for purposes described below. Main storage 48 and any other storage device, can be a magnetic or optical disk drive, but is preferably a solid state storage device. A location code storage 50, which may or may not be the same device as main storage 48, stores the data identifying a received sequence of alphanumeric characters as a location request signal. A timer 52 provides a timing signal to processor 32 to obtain the necessary timing functions described herein. Portable telephone 28 further includes a transmitter/receiver combination ("transceiver") 46 connected to antenna 30.

As mentioned, portable telephone 28 includes a GPS location detector 40. GPS location detector uses signals from any series of positioning satellites, to ascertain the geographical location of portable telephone 28, and generates a corresponding location signal for transmission.

Figure 3:
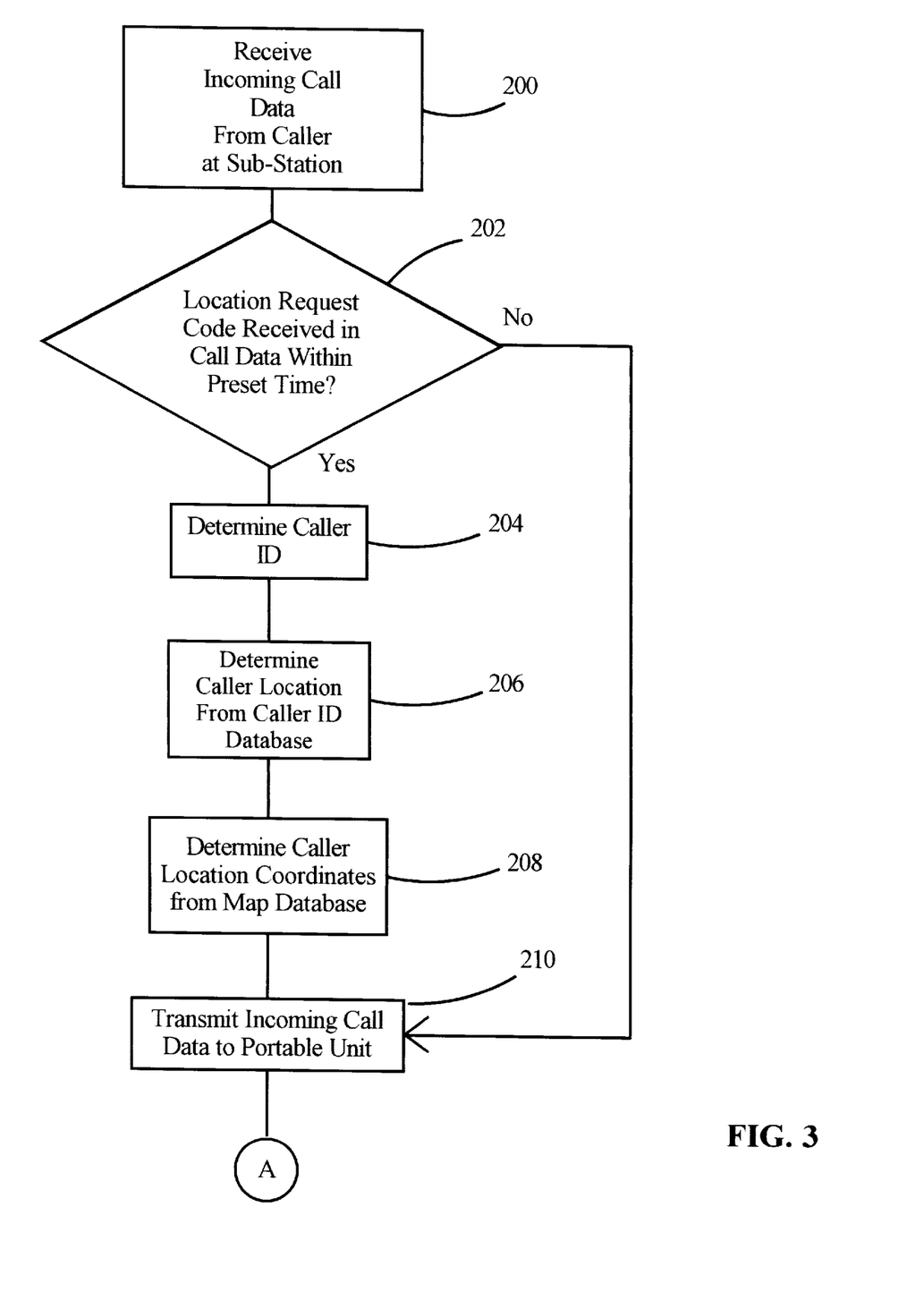
FIGS. 3 and 4 represent a flowchart illustrating a method of the present invention, as might be executed by an apparatus such as that of FIG. 1.
Figure 4A:
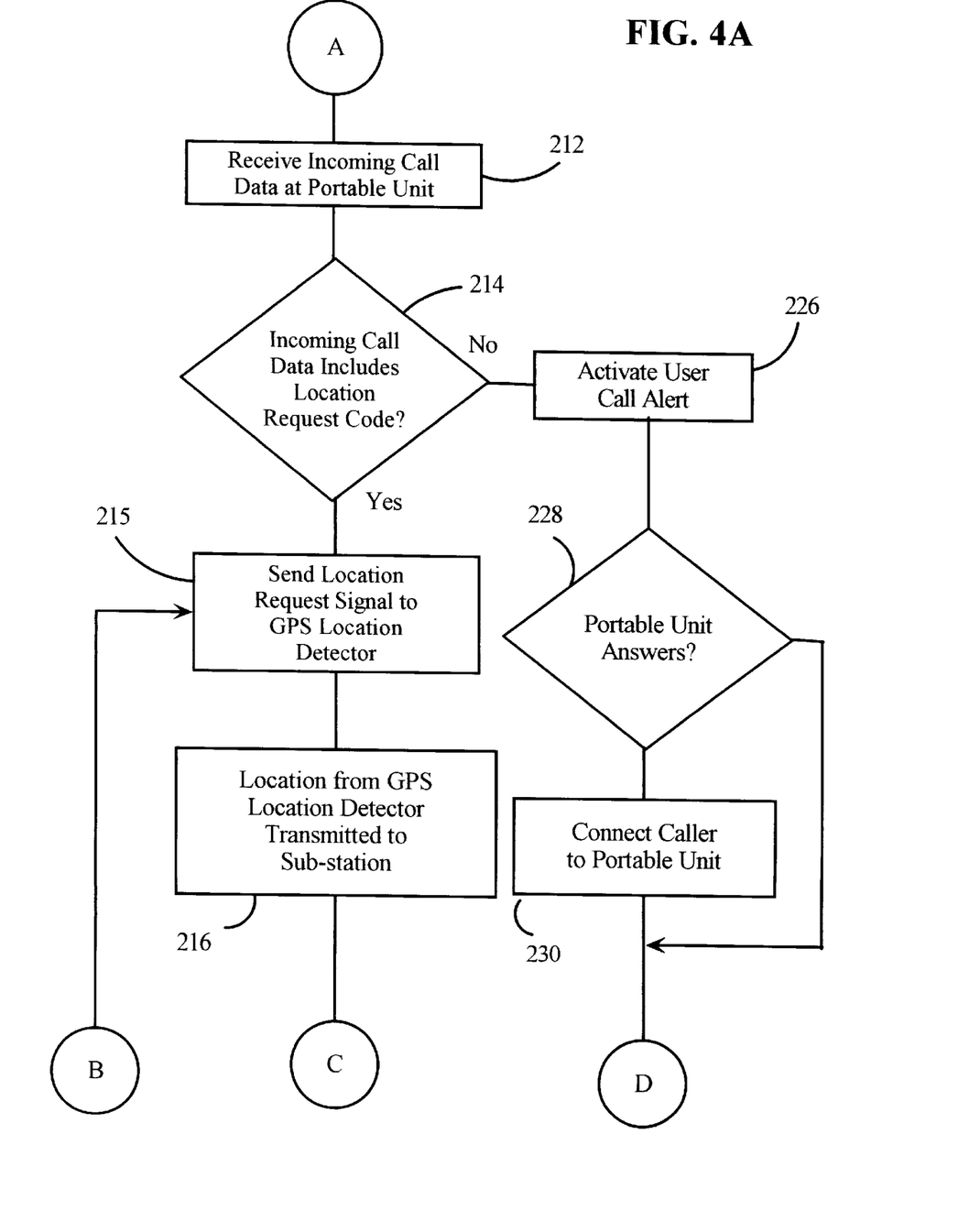
Figure 4B:
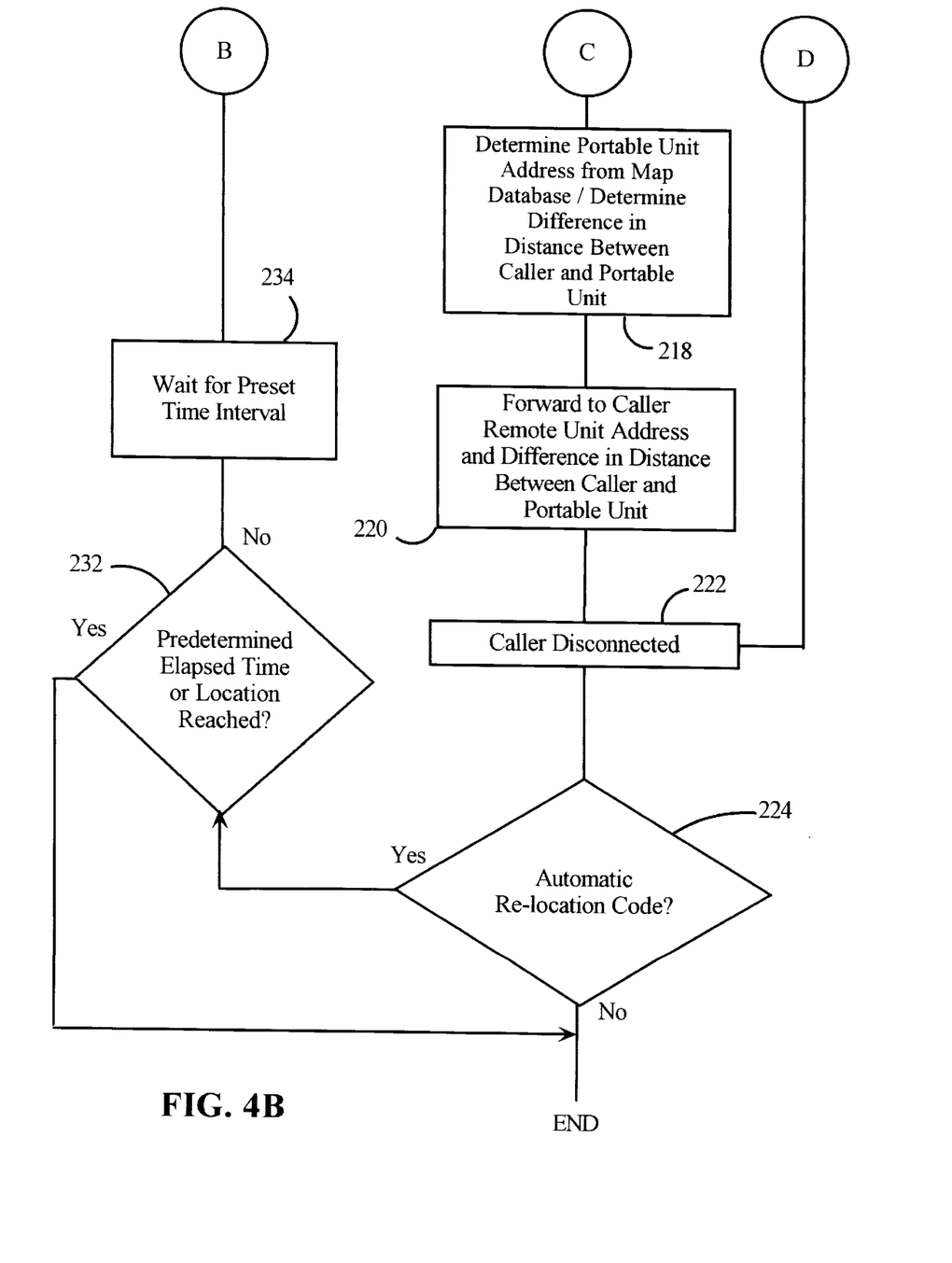

The operation of the telephone system of FIGS. 1 and 2 will now be described, particularly with reference to the flowchart of FIG. 3. First, it will be assumed that portable telephone 28 is not in use (i.e. it is not being used for any type of communication). An individual at a first telephone 10 can communicate with portable telephone 28 or any other similar portable telephone, by dialing the network access code (specifically, the pre-assigned telephone number) of that portable telephone on keypad 14 after lifting handset 12. The exchange 16 of the first network will then direct the call to centralized base station 17. Router 17 of centralized base station will receive (200) the incoming call data from the caller at first telephone 10. The caller ID (telephone number of calling first telephone 10) is also received by router 18 and held temporarily in a memory. Router 18 is programmed to wait a preset time (such as 1 to 2 seconds, or less than 10 or 30 seconds) after connecting with first telephone 10 to see if a location request code (such as the """ mentioned earlier) is then received (202). If no location request code is received within the preset time, the incoming call data (in the form of a normal incoming call alert) is transmitted (210) through transceiver 26 to the portable telephone 28 whose telephone number was dialed by the individual at first telephone 10. If the user of portable telephone 28 chooses to answer that call by pressing an appropriate button on keypad 37, the individual at the calling first telephone 10 and the user at portable telephone 28 (the "caller") can then be connected to engage in an audio conversation in the normal manner. That is, the user will be able to hear the audio information from caller through earphone 36b and respond to speaking into microphone 38. In addition or alternatively, the user can see data sent from a caller on LCD screen 36a**.

Alternatively, when router 18 receives an incoming call from first telephone 10, a voice synthesizer 10 under control of processor 20, may transmit to the calling first telephone 10, a synthesized voice message to the effect that if only the called number's current location is required, the location request code should now be entered (which the voice synthesizer will state is """, for example) and that the call will otherwise be transmitted to the dialed portable telephone if no such code is entered within the predetermined time. Router 18** then waits to see if the location request code is then entered with the predetermined time (202) and proceeds to transmit the call (210) as before, if the location request code is not received within the predetermined time.

In either of the foregoing situations, the caller can either self-initiate entry of a re-location request code or the caller can be given such option with appropriate instructions, acting through processor 20 and voice synthesizer. A re-location request code allows the caller to automatically receive updates on the portable telephone's location. These can be at fixed time intervals or at time intervals determined by the caller by entering further data on keypad 14 of first telephone 10 preferably under voice synthesized instructions from processor 20 and voice synthesizer 19. For example, the re-location request code would be a "#" sign entered on keypad 14 followed by a number indicating the time interval (e.g. every 20 minutes) and total elapsed time (e.g. three hours) during which automatic re-location is requested. Alternatively, the caller can request that they be notified when portable telephone 28 reaches a destination location either identified by the caller through keypad 14 or by voice through handset 12, in which case appropriate voice recognition software will be executed by processor 20.

If router 18 does receive a location request code within the predetermine time, then processor 20 is notified which determines the caller ID (that is, the telephone number of the calling first telephone 10) from router 20 (204). Processor 20 uses caller ID database 22 to then determine the location of the individual (the "caller") at the calling first telephone 10 (206). This location is stored in caller ID database as a street address. By a "street address" is meant information identifying a caller's location by reference to one or more objects (whether natural, or artificial such as a street, city, county or the like name), such as one or more street names and optionally a house number, or the like. Processor 20 uses map database 24 to determine (208) the geographic location (that is, the latitude and longitude co-ordinates) of the calling first telephone 10. The incoming call, in particular the incoming call data in the form of an incoming location request code and optionally a re-location request code, is then transmitted (210) to the called portable telephone 28. It should be noted that it is not essential that the location request code transmitted from centralized hub 17 need not be the same code received from calling first telephone 10. However, for simplicity of discussion, it will be assumed below that they are the same.

When an incoming call signal is received by transceiver 46 of portable telephone 28 (212) it is checked by processor 32 (214) to see if the data in the call signal (that is, the incoming call data) contains a location request code and, if so, does it also contain a re-location request code. If there is no location request code, the user call alert 34 is activated (226). Processor 32 then waits a predetermined time while maintaining user call alert 34 active, to see if the user of portable telephone 28 chooses to answer the incoming call (228). If the user of portable telephone 28 then chooses to answer the call by pressing an appropriate key on keypad 37, within the predetermined time, the caller is connected to portable telephone 28 for two-way communication (230) as described above. If the user does not answer the incoming call within the predetermined time or, after connection either the user or the caller terminates the communication, the caller is disconnected (222). If either of these two events occurs, router 18 at centralized base station 17 also disconnects the caller from base station 17. Since there was no location request code, processor 32 assumes that there can be no automatic re-location activated (224) and the method has reached it's end until another incoming call is received.

If the processor 32 determines (214) that the incoming call signal received by transceiver 46 does contain a location request code, processor 32 then sends (215) a location request signal to GPS location detector 40 without activating user call alert 34. A first location signal, corresponding to the geographical location of portable telephone 38 as determined by GPS location detector 40, is forwarded to processor 32 for transmitting by transceiver 46 back to the centralized base station 17 from which the location request code was received (216). No further communication is required between portable telephone 28 and centralized base station 17 at this time and their connection can be terminated. If no re-location request code was found in the incoming call data by processor 32, no automatic re-location is activated (224) and another further happens at portable telephone 28. If a re-location request code was found (224), and if the re-location request code requested location reports at predetermined time intervals, processor 32 checks (232) through timer 52 whether the total elapsed time has been exceeded and, if so, the routine is brought to the END. If not, processor 32 continues to wait for the predetermined time interval to elapse (234) and when it does, the location from GPS location detector is again transmitted to base station 17 as further location signals. This cycle then continues until the predetermined elapsed time has been exceeded. Of course, each time the location is communicated (216) to base station 17, communication with base station 17 can then be terminated until the predetermined time interval has again elapses (or until there is another incoming or outgoing call at portable telephone 38). Alternatively, if the re-location request signal as determined by processor 32, contained a request for further location reports until a specified destination location is reached, processor 32 will determine from GPS location detector when that specified location is reached (232) and the cycle will END at that time, rather than a predetermined total elapsed time.

Meanwhile, back at base station 17, a first location signal is received within at most, one or two seconds after the corresponding location request data was transmitted from transceiver 26. Using the location information in this first location signal, which will specify a geographic location, processor 20 at base station 17 can execute one or more of a number of alternatives (218) depending on how it has been programmed and/or instructed from calling first telephone 10. For example, processor 20 can use the location information and map database 24 to determine a street address of a called portable telephone 28 from which a location signal has been received. Alternatively, the geographic location of portable telephone 28 and the previously determined geographic location of calling first telephone 10 (based on received caller ID, as discussed above) can be used by processor 20 to calculate the distance between called portable telephone 28 and calling first telephone 10. This distance can be a straight line distance or the distance based on the shortest road route using map database 24. Further travel time can be estimated between the location of called portable telephone 28 and calling first telephone 10. Any or all of these items of information can be forwarded (220) to the calling first telephone 10 from processor 20 to appear as data on a suitable LCD display screen on first telephone 10 (not shown) or using voice synthesizer 19 to provide the information as an audio output to calling first telephone 10. When the information has been forwarded, router 18 can disconnect (222) the calling first telephone. If further location signals are received automatically from called portable telephone 28 as a result of a re-location request code from calling first telephone 10, router 18 can upon receipt of such signals automatically dial the calling first telephone 10, perform the necessary distance/street address determinations discussed above (218) and forward (220) any of the same foregoing information items for the new received location of called portable telephone 28.

It will be appreciated that instead of a called portable telephone 28 keeping track of re-location requests automatically, as described in detail above in connection with the drawings, this can be done instead at processor 20 of centralized base station 17. In this variation, each time a location signal is received from called portable telephone 28, communication is then terminated until the elapsed interval has passed, at which point base station 17 calls the called portable telephone 28 again and a new location request code is sent from base station 17 to the called portable telephone 28. Thus in the drawings, following step (234) (which occurs at centralized base station 17 in this variation), step (210) is executed at the base station and the cycle is from there to END.

Thus, it will be seen that the present invention enables retrieval of a portable phone's location from any other telephone, without disturbing the portable phone's user (this is sometimes referenced as a background operation mode). Further, the invention allows automatic updates of locations to be sent to a caller all again without disturbing the portable phone's user. However, the user can bypass any background operation by means of bypass switch 42, ensuring that no locations are transmitted without the user being alerted by user call alert 34 and then allowing the user to answer the call on the user interface if desired. Bypass switch 42 can further also allows the user to completely deactivate background operation so that received incoming calls carrying only a location request code will be automatically disconnected without GPS location detector 40 providing a location signal. It will also be appreciated that the present invention could be applied to other communication devices than telephones. For example, instead of a portable telephone a portable communication device, such as a pager could be used. Similarly, any of first telephones 10 could be replaced by another communication device.

Variations and modifications to the above described embodiments are, of course, possible. Accordingly, the present invention is not limited to the embodiments described above.

I claim:

1. A portable telephone capable of background location transmission response, comprising:
    a) a position locator which, in response to a location request signal, can determine the location of the portable telephone and generate a corresponding location signal;
    b) a receiver to receive an incoming call signal and an incoming location request signal;
    c) a user interface having:
        an audio or visual user output device which can reproduce audio or visual information in an incoming call signal as a corresponding audio or visual display; and
        an audio user input device which generates an audio output signal corresponding to a user's voice;
    d) an alert generator which, in response to a received incoming call signal, generates a first physical characteristic to indicate an incoming call to a user of the portable telephone,
    e) a location request detector which, in response to a received location request signal, can direct the location request signal to the position locator without activating the alert generator; and
    f) a transmitter to transmit a location signal generated by the position locator in response to a received location request signal, and to transmit the audio output signal;
    wherein the first alert generator, in response to a received location request signal, can generate a second physical characteristic which may be the same or different from the first physical characteristic, to indicate an incoming location request to a user, the portable telephone additionally comprising:
        a first switch which allows a user to select whether or not the location request detector causes the alert generator to generate the second physical characteristic in response to a received location request signal.

2. A portable telephone capable of background location transmission response, comprising:
    a) a position locator which, in response to a location request signal, can determine the location of the portable telephone and generate a corresponding location signal;
    b) a receiver to receive an incoming call signal and an incoming location request signal;
    c) a user interface having:
        an audio or visual user output device which can reproduce audio or visual information in an incoming call signal as a corresponding audio or visual display; and
        an audio user input device which generates an audio output signal corresponding to a user's voice;
    d) an alert generator which, in response to a received incoming call signal, generates a first physical characteristic to indicate an incoming call to a user of the portable telephone,
    e) a location request detector which, in response to a received location request signal, can direct the location request signal to the position locator without activating the alert generator; and
    f) a transmitter to transmit a location signal generated by the position locator in response to a received location request signal, and to transmit the audio output signal;
    additionally comprising a timer which following a received location request signal, causes the location request detector to periodically provide updated location signals to the transmitter for transmitting.

3. A portable telephone according to claim 2 additionally comprising:
    a memory which stores a received network identification of the source of an incoming location request signal; and
    a processor which, at preselected time periods, causes the transmitter to transmit to the stored network identification, a current location signal corresponding to a current location of the portable telephone obtained from the position locator.

4. A portable telephone capable of background location transmission response, comprising:
    a) a position locator which, in response to a location request signal, can determine the location of the portable telephone and generate a corresponding location signal;
    b) a receiver to receive an incoming call signal and an incoming location request signal;
    c) a user interface having:
        an audio or visual user output device which can reproduce audio or visual information in an incoming call signal as a corresponding audio or visual display; and
        an audio user input device which generates an audio output signal corresponding to a user's voice;
    d) an alert generator which, in response to a received incoming call signal, generates a first physical characteristic to indicate an incoming call to a user of the portable telephone,
    e) a location request detector which, in response to a received location request signal, can direct the location request signal to the position locator without activating the alert generator; and
    f) a transmitter to transmit a location signal generated by the position locator in response to a received location request signal, and to transmit the audio output signal;
    wherein the first physical characteristic generated by the alert generator is an audio, visual or tactile alarm, the portable telephone additionally comprises a second switch by which a user can optionally elect to use the user interface upon receipt of a location request signal.

5. A centralized base station having:
    (i) means for receiving from any calling one of a plurality of first telephones, an incoming location request signal;

(ii) a transceiver to transmit an incoming location request signal to a portable telephone, and to receive a location signal from the portable telephone;

(iii) a location identification means for determining the location of the calling one of the first telephones from a caller identification carried by the incoming signal;

(iv) a comparator for determining the distance between the location received from the portable telephone and the location of the calling one of the first telephones, and generating a resulting distance signal or estimated travel time signal; and (v) means for forwarding the distance signal or estimated travel time signal to the calling one of the first telephones or the portable telephone.

6. A telephone system according to claim 5 wherein the forwarding means comprises a voice synthesizer.

7. A telephone system according to claim 5 wherein the forwarding means forwards the distance signal or estimated travel time signal to the calling one of the first telephones.

8. A telephone system according to claim 5 wherein:

the centralized base station is connected to a first network through which any of the first telephones can communicate with the centralized base station;

the location identification means can determine the location of any calling one of the first telephones from a caller identification carried by an incoming signal from the calling one of the first telephones, which caller identification is in the form of a first network access code for the calling one of the first telephones; and the location identification means includes a caller identification database which correlates network access codes for each of the first telephones with locations of the first telephones.

9. A method of communicating with a portable telephone and obtaining a background location transmission response from the portable telephone, comprising:

a) communicating a call signal from a first telephone to a centralized base station through a first network through which any of a plurality of first telephones can communicate with the centralized base station;

b) transmitting an incoming call signal received from a first telephone at the base station, from the centralized base station to the portable telephone;

b) receiving the incoming call signal at the portable telephone;

c) activating an alert generator on the portable telephone in response to the received incoming call signal, so as to generate a first physical characteristic to indicate an incoming call to a user of the portable telephone;

c) transmitting an audio output signal corresponding to a user's voice, from the portable telephone to the centralized base station;

d) communicating a location request signal from a first telephone through the first network to the centralized base station;

e) transmitting an incoming location request signal received from a first telephone at the base station, from the centralized base station to the portable telephone;

f) receiving the location request signal at the portable telephone;

g) directing the location request signal to a position locator on the portable telephone without activating the alert generator, which position locator can determine the location of the portable telephone and generate a corresponding location signal;

c) transmitting the location signal form the portable telephone to the centralized base station; and d) communicating location information corresponding to the location signal, from the centralized base station to the first telephone which communicated the location request to the base station;

the method additionally comprising:

determining the location of the first telephone which communicated the location request to the base station, from a caller identification carried by the incoming signal received at the base station;

determining the distance between the location received from the portable telephone and the location of the first telephones corresponding to the caller identification signal, and generating a resulting distance signal or estimated travel time signal; and forwarding the distance signal or estimated travel time signal to the first telephone which communicated the location request to the base station.

10. A portable telephone capable of background location transmission response, comprising:

a) a position locator which, in response to a location request signal, can determine the location of the portable telephone and generate a corresponding location signal;

b) a receiver to receive an incoming call signal and an incoming location request signal;

c) a user interface having:

an audio or visual user output device which can reproduce audio or visual information in an incoming call signal as a corresponding audio or visual display; and an audio user input device which generates an audio output signal corresponding to a user's voice;

d) an alert generator which, in response to a received incoming call signal, generates a first physical characteristic to indicate an incoming call to a user of the portable telephone, e) a location request detector which, in response to a received location request signal, can direct the location request signal to the position locator without activating the alert generator;

f) a transmitter to transmit a location signal generated by the position locator in response to a received location request signal, and to transmit the audio output signal; and g) a switch which allows a user to select whether or not a location signal is provided in response to a location request signal during operation of the telephone.

* * * * *